US011362516B2

(12) United States Patent
Kitaji

(10) Patent No.: US 11,362,516 B2
(45) Date of Patent: Jun. 14, 2022

(54) POWER MANAGEMENT SERVER AND POWER MANAGEMENT METHOD

(71) Applicant: KYOCERA Corporation, Kyoto (JP)

(72) Inventor: Mitsuhiro Kitaji, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/965,599

(22) PCT Filed: Dec. 19, 2018

(86) PCT No.: PCT/JP2018/046767
§ 371 (c)(1),
(2) Date: Jul. 29, 2020

(87) PCT Pub. No.: WO2019/150814
PCT Pub. Date: Aug. 8, 2019

(65) Prior Publication Data
US 2021/0050726 A1 Feb. 18, 2021

(30) Foreign Application Priority Data
Jan. 30, 2018 (JP) .............................. JP2018-013525

(51) Int. Cl.
*G05B 19/042* (2006.01)
*H02J 3/32* (2006.01)
(Continued)

(52) U.S. Cl.
CPC .............. *H02J 3/32* (2013.01); *G05B 19/042* (2013.01); *H02J 7/0048* (2020.01);
(Continued)

(58) Field of Classification Search
None
See application file for complete search history.

(56) References Cited

U.S. PATENT DOCUMENTS

| 10,535,999 B2 | 1/2020 | Hidaka | |
| 2002/0152305 A1* | 10/2002 | Jackson | H04L 43/00 709/224 |

(Continued)

FOREIGN PATENT DOCUMENTS

| WO | 2015136920 A1 | 9/2015 |
| WO | 2016006205 A1 | 1/2016 |

(Continued)

*Primary Examiner* — Jason Lin
(74) *Attorney, Agent, or Firm* — Hauptman Ham, LLP

(57) ABSTRACT

A power management server comprises a controller configured to manage a storage battery apparatus shared by a plurality of entities, and a receiver configured to receive requests each including an information element indicating a requested amount of power including at least one of a virtual discharge amount and a virtual charge amount of the storage battery apparatus. The controller is configured to manage power usage of the storage battery apparatus for each of the plurality of entities. The controller is configured to manage a virtual remaining power storage amount of the storage battery apparatus for each of the plurality of entities. The controller is configured to determine an allocated amount of power for the requested amount of power based on the power usage, when a constraint condition is satisfied by duplication of the requests.

7 Claims, 5 Drawing Sheets

(51) Int. Cl.
　　　*H02J 13/00*　　　(2006.01)
　　　*H02J 7/00*　　　(2006.01)
　　　*H02J 3/38*　　　(2006.01)
(52) U.S. Cl.
　　　CPC .............................. *H02J 13/00006* (2020.01);
　　　　　　　　*G05B 2219/2639* (2013.01); *H02J 3/381*
　　　　　　　　　　　　　　　　　　　　　　(2013.01)

(56) References Cited

U.S. PATENT DOCUMENTS

| | | | |
|---|---|---|---|
| 2010/0076825 A1* | 3/2010 | Sato | B60L 55/00 |
| | | | 705/14.1 |
| 2012/0130556 A1 | 5/2012 | Marhoefer | |
| 2015/0207323 A1* | 7/2015 | Baba | H02J 3/383 |
| | | | 307/20 |
| 2016/0125339 A1* | 5/2016 | Itaya | H02J 3/14 |
| | | | 705/7.25 |
| 2017/0070089 A1 | 3/2017 | Fukubayashi et al. | |
| 2019/0123561 A1* | 4/2019 | Kudo | H02J 13/0017 |

FOREIGN PATENT DOCUMENTS

| | | | | |
|---|---|---|---|---|
| WO | WO-2016006205 A1 * | 1/2016 | ............ | G06Q 50/06 |
| WO | 2016136263 A1 | 9/2016 | | |

\* cited by examiner

FIG. 3

| TIME ZONE | t1 | t2 | t3 | t4 | t5 | t6 | t7 | t8 | t9 | t10 | t11 | t12 |
|---|---|---|---|---|---|---|---|---|---|---|---|---|
|   |   | C | C |   |   |   |   |   |   |   |   |   |
|   | C | C | C |   | C |   | C | C |   |   |   |   |
|   | B | B | B |   | C | C | C | C |   |   |   |   |
|   | A | B | B | C | B | C | B | C |   |   |   |   |
|   | A | A | B | B | A | B | A | B |   |   |   |   |
|   | A | A | A | B | A | A | A | B |   |   |   |   |

|←——————— REFERENCE PERIOD ———————→|

TARGET TIME ZONE

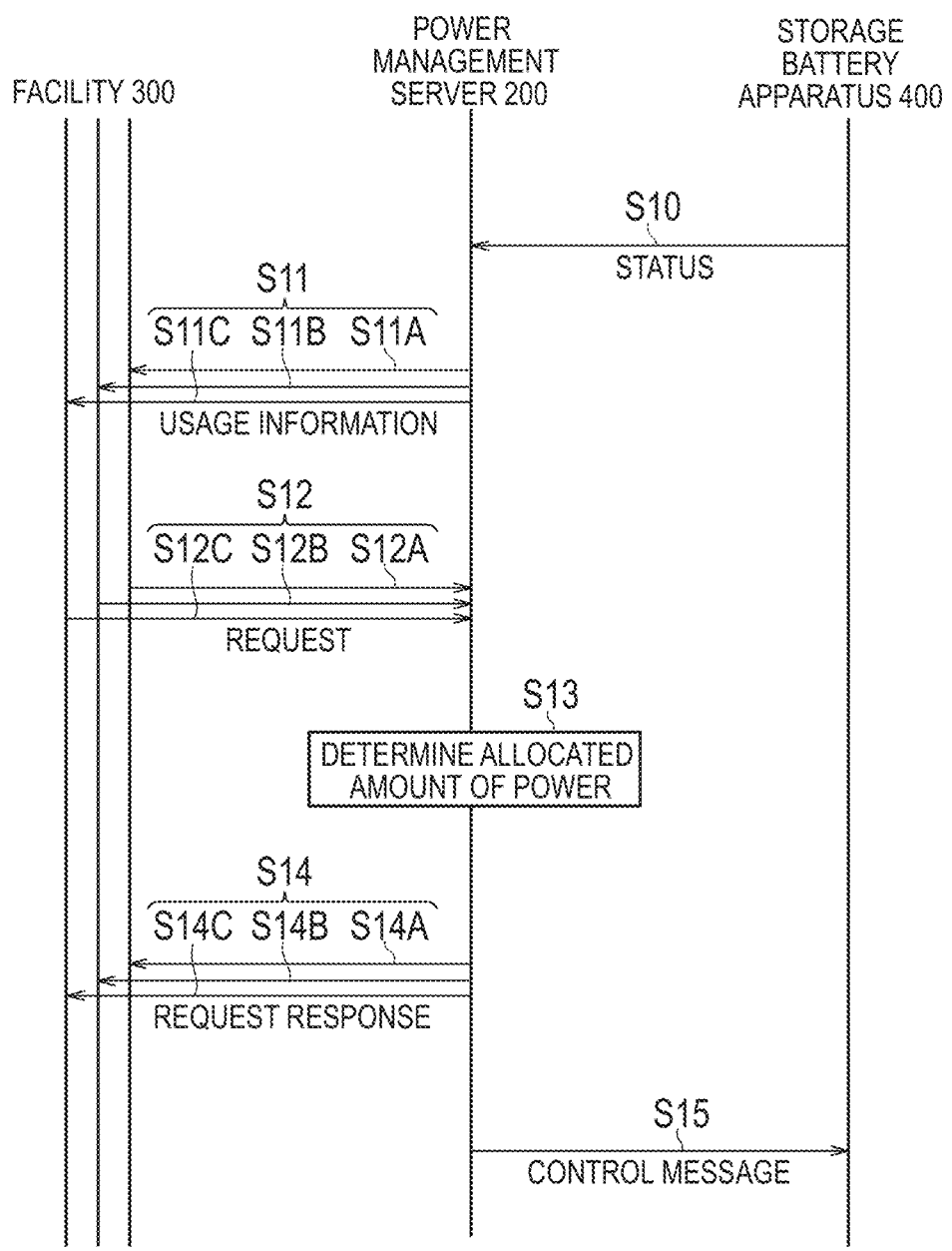

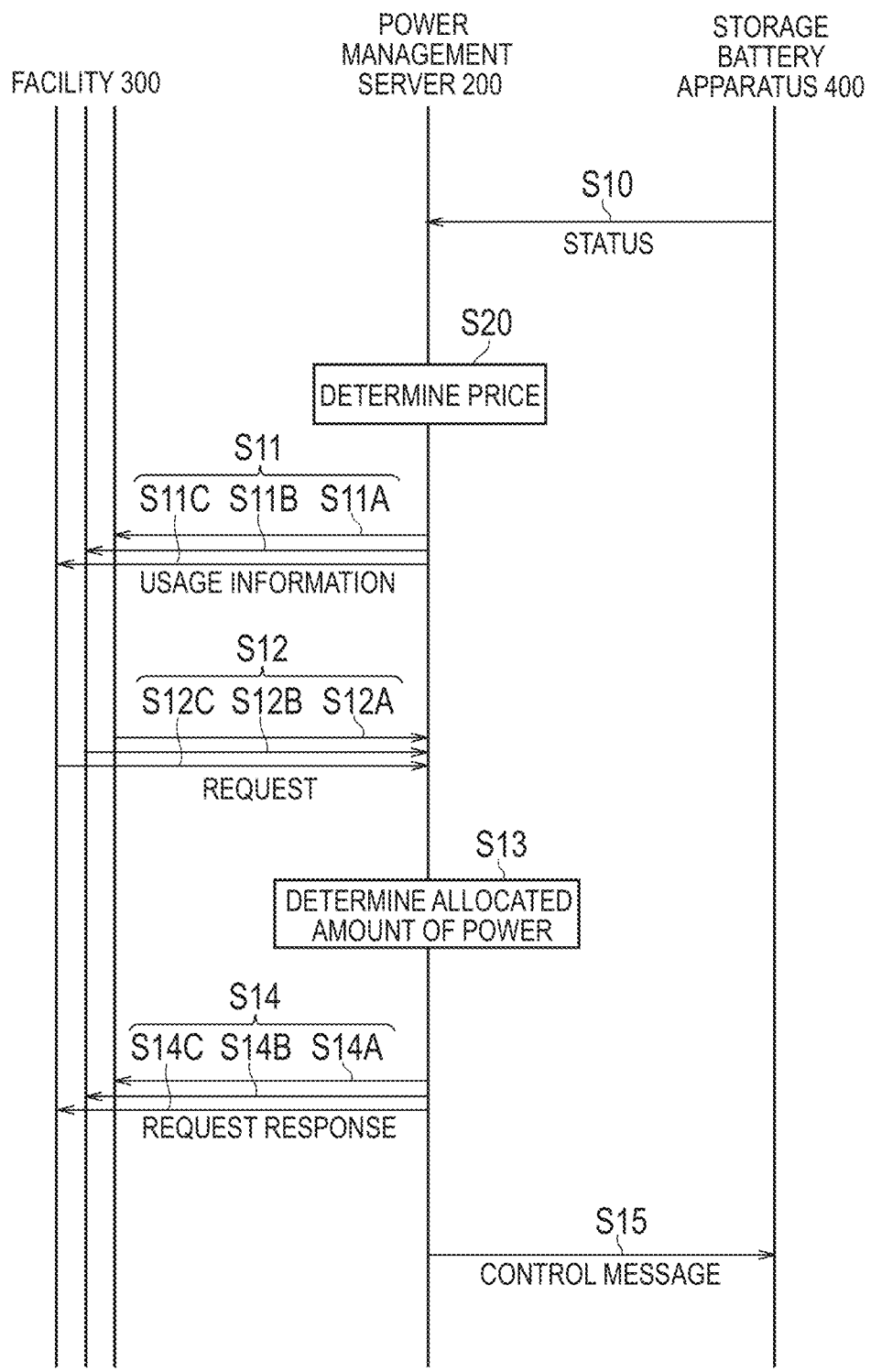

POWER MANAGEMENT SERVER AND POWER MANAGEMENT METHOD

RELATED APPLICATIONS

The present application is a National Phase of International Application No. PCT/JP2018/046767, filed Dec. 19, 2018, and claims priority based on Japanese Patent Application No. 2018-013525, filed Jan. 30, 2018.

TECHNICAL FIELD

The present invention relates to a power management server and a power management method.

BACKGROUND ART

In recent years, a technique has been proposed in which a plurality of facilities share one or more storage battery apparatuses. Power storage capacity allocated to the facility increases with a request for charging obtained from the facility and decreases with a request for discharging obtained from the facility (for example, Patent Literature 1).

CITATION LIST

Patent Literature

Patent Literature 1: WO 2016/136263 A

SUMMARY OF INVENTION

A power management server according to a first feature comprises a receiver configured to receive requests from a plurality of entities each request including information indicating a requested amount of power including at least one of a virtual discharge amount and a virtual charge amount of a storage battery apparatus shared by the plurality of entities and a controller configured to monitor power usage of the storage battery apparatus for each of the plurality of entities. The controller is configured to estimate a future remaining power storage amount of the storage battery apparatus for each of the plurality of entities. The controller is configured to determine an allocated amount of power for the requested amount of power based on the power usage upon satisfaction of a constraint condition as a result of the requests received in a short period of time.

A power management method according to a second feature comprises the steps of obtaining requests from a plurality of entities, each request including information indicating a requested amount of power including at least one of a virtual discharge amount and a virtual charge amount of a storage battery apparatus shared by a plurality of entities, monitoring power usage of the storage battery apparatus for each of the plurality of entities, estimating a future remaining power storage amount of the storage battery apparatus for each of the plurality of entities, and determining an allocated amount of power for the requested amount of power based on the power usage upon satisfaction of a constraint condition as a result of the requests received in a short period of time.

BRIEF DESCRIPTION OF DRAWINGS

FIG. 3 is a diagram for explaining determination of an allocated amount of power according to the embodiment.

FIG. 4 is a diagram illustrating a power management method according to the embodiment.

FIG. 5 is a diagram illustrating a power management method according to Modification 1.

DESCRIPTION OF EMBODIMENTS

Figure 1:
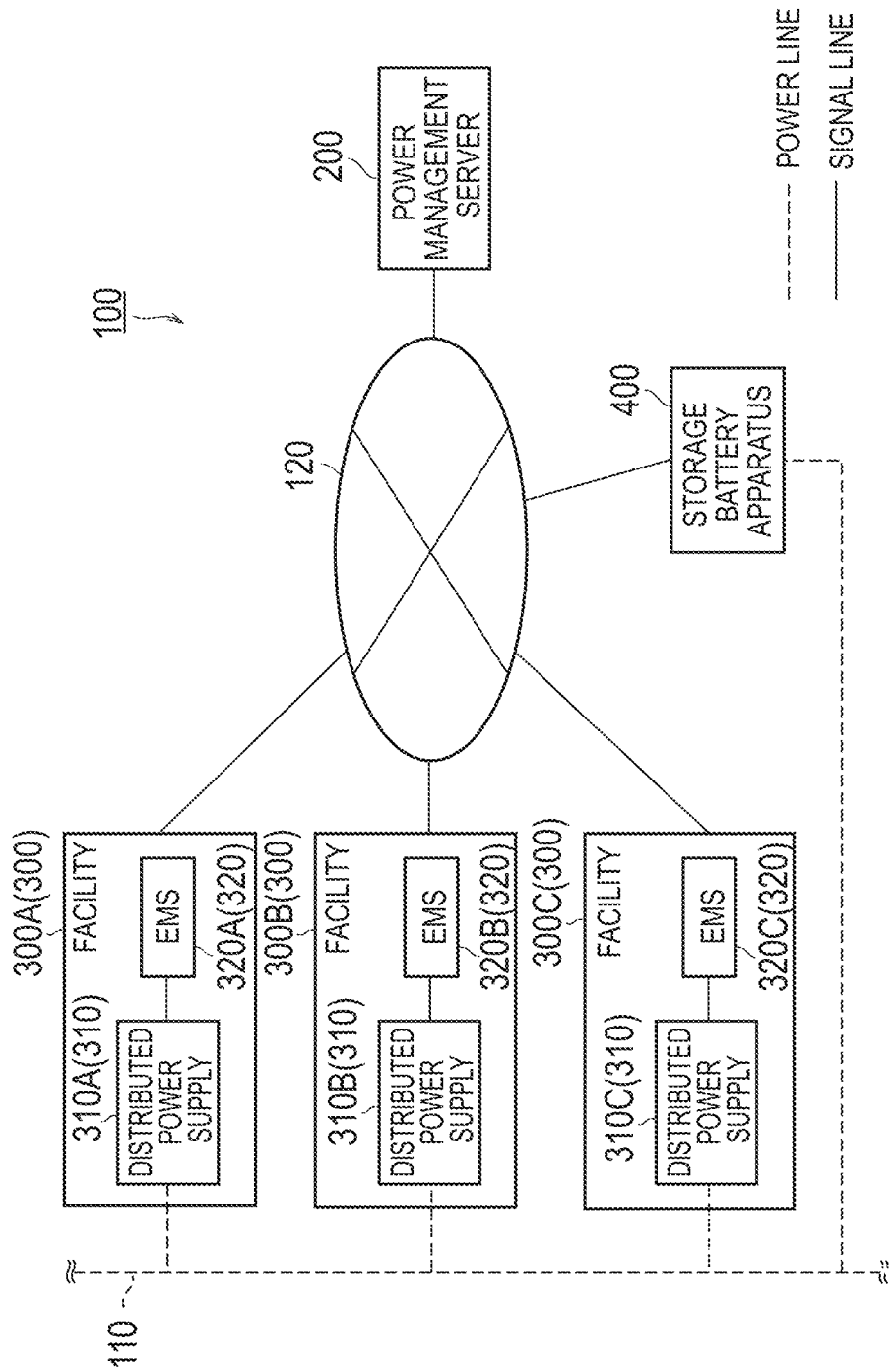
FIG. 1 is a diagram illustrating a power management system 100 according to an embodiment.

When requests for charging or discharging obtained from a plurality of facilities are received in a short period of time, there may be cases where it is not possible to deal with all requests by constraints such as a remaining charge amount or remaining power storage amount of the storage battery apparatus and chargeable power or dischargeable power of the storage battery apparatus per unit time. In such a case, it is necessary to appropriately allocate a charge power amount or a discharge power amount to the plurality of facilities.

The present embodiment provides a power management server and a power management method capable of appropriately allocating the charge power amount or the discharge power amount to a plurality of entities when the plurality of requests are received in a short period of time.

Hereinafter, the embodiment will be described with reference to the drawings. In the following description of the drawings, the same or similar parts are denoted by the same or similar reference numerals.

However, it should be noted that the drawings are schematic and a ratio of each dimension may be different from an actual one. Therefore, specific dimensions and the like should be determined in consideration of the following description. Further, it is needless to say that the drawings may include portions having different dimensional relationships or ratios.

Embodiment (Power Management System)

Hereinafter, the power management system according to the embodiment will be described.

As illustrated in FIG. 1, a power management system 100 includes a power management server 200, facilities 300, and a storage battery apparatus 400. In FIG. 1, facilities 300A to 300C are illustrated as the facilities 300.

Each facility 300 is an example of the entities. Each facility 300 is connected to a power grid 110. Hereinafter, a flow of power from the power grid 110 to the facilities 300 is referred to as a power flow, and a flow of power from the facilities 300 to the power grid 110 will be referred to as a reverse power flow. The storage battery apparatus 400 is connected to the power grid 110.

The power management server 200, the facilities 300 and the storage battery apparatus 400 are connected to a network 120. The network 120 may provide a line between the power management server 200 and the facilities 300 and a line between the power management server 200 and the storage battery apparatus 400. For example, the network 120 is the Internet. The network 120 may provide a dedicated line such as a VPN (Virtual Private Network).

The power management server 200 manages the storage battery apparatus 400 shared by the plurality of facilities 300. The power management server 200 is a server managed by an electric power operator such as a power generation operator, a power transmission and distribution operator, a retailer, or a resource aggregator. The resource aggregator is the electric power operator that provides power of the reverse power flow to the power generation operator, the power transmission and distribution operator, the retailer and the like in a VPP (Virtual Power Plant). In the embodiment, details of the power management server 200 will be described below (see FIG. 2).

Here, the power management server 200 may transmit, to an EMS 320 provided in the facility 300, a control message instructing control for a distributed power supply 310 provided in the facility 300. For example, the power management server 200 may transmit a power flow control message (for example, DR; Demand Response) requesting power flow control, or may transmit a reverse power flow control message requesting reverse power flow control. Further, the power management server 200 may transmit a power supply control message controlling an operating state of the distributed power supply. Degree of power flow control or degree of reverse power flow control may be represented by an absolute value (for example, XX kW) or a relative value (for example, XX %). Alternatively, the degree of power flow control or reverse power flow control may be represented by two or more levels. The degree of power flow control or reverse power flow control may be represented by power rate (RTP; Real Time Pricing) determined by a current power supply and demand balance, or may be represented by power rate (TOU; Time Of Use) determined by a past power supply and demand balance.

The facility 300 has the distributed power supply 310 and the EMS 320. The facility 300 may have a load equipment that consumes power. For example, the load equipment is an air conditioning equipment, a lighting equipment, an AV (Audio Visual) equipment, or the like.

The distributed power supply 310 is an apparatus that generates power. The distributed power supply 310 may be an apparatus that generates power using renewable energy such as sunlight, wind power, hydraulic power, and geothermal heat. Such a distributed power supply 310 is a solar cell apparatus, a wind power generation apparatus, a hydroelectric power generation apparatus, a geothermal power generation apparatus, or the like. The distributed power supply 310 may be an apparatus that generates power using fuel. Such a distributed power supply 310 includes a solid oxide fuel cell (SOFC), a polymer electrolyte fuel cell (PEFC), and a phosphoric acid fuel cell (PAFC), a molten carbonate fuel cell (MCFC), and the like.

The EMS 320 is a system (EMS; Energy Management System) that manages the power of the facility 300. The EMS 320 may control the operating state of the distributed power supply 310. The EMS 320 is an example of VEN (Virtual End Node).

In the embodiment, communication between the power management server 200 and the EMS 320 may be performed according to a first protocol. On the other hand, communication between the EMS 320 and the distributed power supply 310 may be performed according to a second protocol different from the first protocol. For example, as the first protocol, a protocol conforming to Open ADR (Automated Demand Response) or an original dedicated protocol can be used. For example, as the second protocol, a protocol conforming to ECHONET Lite, SEP (Smart Energy Profile) 2.0, KNX, or an original dedicated protocol can be used. The first protocol and the second protocol only need to be different, and, for example, both only need to be protocols created according to different rules even if they are unique dedicated protocols. Communication between the power management server 200 and the storage battery apparatus 400 may be performed according to the first protocol or the second protocol.

The storage battery apparatus 400 is shared by the plurality of facilities 300. For each of the plurality of facilities 300, a virtual remaining power storage amount of the storage battery apparatus 400 is managed. The virtual (future) remaining power storage amount is the remaining power storage amount virtually managed for each facility 300. The virtual remaining power storage amount fluctuates according to the request including an information element indicating a requested amount of power including at least one of a virtual discharge amount and a virtual charge amount of the storage battery apparatus 400. Specifically, the virtual remaining power storage amount decreases with a request for virtual discharge and increases with a request for virtual charge. The request for virtual discharge may include the information element indicating a virtual discharge request and the information element indicating the virtual discharge amount. The request for virtual charge may include the information element indicating a virtual charge request and the information element indicating the virtual charge amount.

The virtual remaining power storage amount of the storage battery apparatus 400 may be managed independently of an actual remaining power storage amount of the storage battery apparatus 400. The actual remaining power storage amount is the actual remaining power storage amount of the storage battery apparatus 400. The actual remaining power storage amount decreases by an actual discharge of the storage battery apparatus 400 and increases by an actual charge of the storage battery apparatus 400. Here, independent management means that actual discharge and charge timings of the storage battery apparatus 400 are independent of establishing timings of transactions of virtual discharge and virtual charge.

(Power Management Server)

Figure 2:
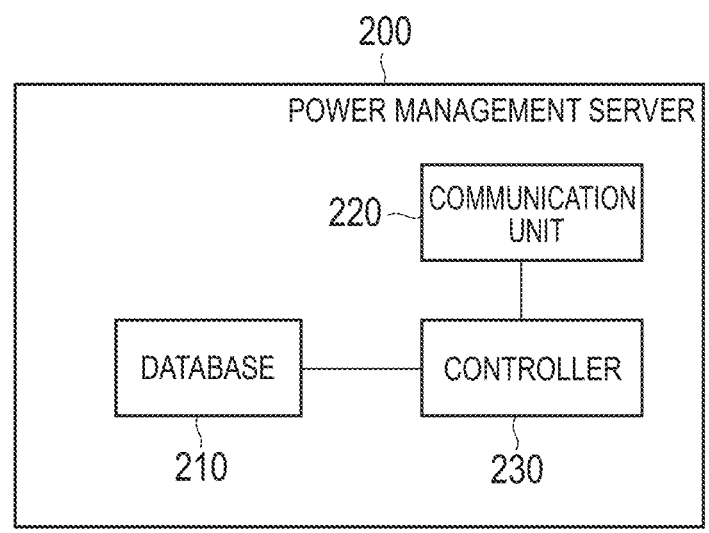
FIG. 2 is a diagram illustrating a power management server 200 according to the embodiment.

Hereinafter, the power management server according to the embodiment will be described. As illustrated in FIG. 2, the power management server 200 has a database 210, a communication unit 220, and a controller 230. The power management server 200 is an example of VTN (Virtual Top Node).

The database 210 includes a storage medium such as a non-volatile memory and/or an HDD, and stores data regarding the facilities 300 managed by the power management server 200. The facility 300 managed by the power management server 200 may be the facility 300 having a contract with the electric power operator.

The data regarding the facilities 300 includes power usage of the storage battery apparatus 400 for each of the plurality of facilities 300. The power usage is an amount of power related to the above-mentioned virtual discharge or virtual charge. The power usage may include a past record actually performed in the past. The past record is the amount of power used in the past. The power usage may include a future prospect that is planned in the future. The future prospect is the amount of power that is planned to be used in a fixed plan. The data regarding the facilities 300 may include a virtual capacity frame of the storage battery apparatus 400 for each of the plurality of facilities 300, may include the virtual remaining power storage amount of the storage battery apparatus 400, and may include a virtual charge reserve capacity that is a difference between the virtual capacity frame and the virtual remaining power storage amount. The virtual capacity frame is a capacity virtually allocated to the facility 300, and may be defined by the contract between the electric power operator and a user.

For example, the data regarding the facilities 300 may be demand power supplied from the power grid 110 to the facilities 300, and may be the amount of power reduced in the facilities 300 according to demand response (DR) of the demand power of the entire power grid 110. The data regarding the facility 300 may be a type of the distributed power supply 310 provided in the facility 300, specifications of the distributed power supply 310 provided in the facility 300, and the like. The specifications may be rated power generation (W), the maximum output power (W) and the like of the distributed power supply 310.

The database 210 may store data regarding the storage battery apparatus 400. The data regarding the storage battery apparatus 400 may include an actual capacity of the storage battery apparatus 400, may include the actual remaining power storage amount of the storage battery apparatus 400, and may include an actual power storage reserve capacity that is a difference between the actual capacity and the actual remaining power storage amount. The data regarding the storage battery apparatus 400 may include the dischargeable power of the storage battery apparatus 400 in unit time or may include the chargeable power of the storage battery apparatus 400 in unit time.

The communication unit 220 includes a communication module, and communicates with the EMS 320 through the network 120. The communication unit 220 performs communication according to the first protocol as described above. For example, the communication unit 220 transmits a first message to the EMS 320 according to the first protocol. The communication unit 220 receives a first message response from the EMS 320 according to the first protocol.

In the embodiment, the communication unit 220 constitutes a receiver that receives the request including the information element indicating the requested amount of power including at least one of the virtual discharge amount and the virtual charge amount of the storage battery apparatus 400. The communication unit 220 may receive the request from the facility 300 (for example, EMS320). The communication unit 220 may receive the request from a terminal (for example, a smartphone, a tablet, and a personal computer) belonging to the user of the facility 300.

The communication unit 220 may constitute a transmitter that transmits a request response including the information element indicating the allocated amount of power for the requested amount of power. The communication unit 220 may transmit the request response to the facility 300 (for example, EMS 320) or may transmit the request response to the terminal belonging to the user of the facility 300. The allocated amount of power is determined by the controller 230 as described below.

The communication unit 220 communicates with the storage battery apparatus 400 through the network 120. As described above, the communication unit 220 may perform communication according to the first protocol and may perform communication according to the second protocol. For example, the communication unit 220 receives a message including the information element indicating the actual capacity of the storage battery apparatus 400 from the storage battery apparatus 400. The communication unit 220 receives from the storage battery apparatus 400 a message (status) including the information element indicating at least one of the actual remaining power storage amount and an actual charge reserve capacity of the storage battery apparatus 400.

The controller 230 includes a memory, a CPU and the like, and controls components provided in the power management server 200. For example, the controller 230 instructs the EMS 320 provided in the facility 300 to control the distributed power supply 310 provided in the facility 300 by transmitting the control message. As described above, the control message may be the power flow control message, the reverse power flow control message, or the power supply control message.

In the embodiment, the controller 230 manages the data stored in the database 210. For example, the controller 230 manages the power usage of the storage battery apparatus 400 for each of the plurality of facilities 300. The controller 230 manages the virtual remaining power storage amount of the storage battery apparatus 400 for each of the plurality of facilities 300. The controller 230 may manage the virtual remaining power storage amount of the storage battery apparatus 400 independently of the actual remaining power storage amount of the storage battery apparatus 400.

The controller 230 determines the allocated amount of power for the requested amount of power. The controller 230 determines the allocated amount of power within a range of the virtual capacity frame. Specifically, the controller 230 determines the allocated amount of power for the virtual discharge amount within a range that does not exceed the virtual remaining power storage amount. The controller 230 determines the allocated amount of power for the virtual charge amount within a range that does not exceed the virtual charge reserve capacity.

Here, the controller 230 determines the allocated amount of power for the requested amount of power based on the power usage upon satisfaction of a constraint condition as a result of the requests received in a short period of time. The constraint condition is determined based on at least one of the actual remaining power storage amount of the storage battery apparatus 400, an actual remaining discharge amount of the storage battery apparatus 400, the chargeable power of the storage battery apparatus 400 in unit time, and the dischargeable power of the storage battery apparatus 400 in unit time.

Specifically, the controller 230 may determine that the constraint condition is satisfied when a total virtual discharge amount exceeds the actual remaining power storage amount as a result of the requests received in a short period of time. The controller 230 may determine that the constraint condition is satisfied when a total virtual charge amount exceeds the actual charge reserve capacity as a result of the requests received in a short period of time. The controller 230 may determine that the constraint condition is satisfied when a total virtual discharge power per unit time exceeds the dischargeable power as a result of the requests received in a short period of time. The controller 230 may determine that the constraint condition is satisfied when a total virtual charge power per unit time exceeds the chargeable power as a result of the requests received in a short period of time.

Here, when the constraint condition is satisfied as a result of the requests received in a short period of time, the power usage referred to in determination of the allocated amount of power may be the power usage of the virtual discharge. When the constraint condition is satisfied as a result of the requests received in a short period of time, the power usage referred to in determination of the allocated amount of power may be the power usage of the virtual charge.

For example, as illustrated in FIG. 3, consider a case where the requests are received in a short period of time with a time zone t9 as a target time zone. When the constraint condition is satisfied in such a case, the controller 230 determines the allocated amount of power for the requested amount of power based on the power usage with a time zone t1 to a time zone t8 as a reference period. In FIG. 3, consider a case where the total virtual discharge power exceeds the dischargeable power or the total virtual charge power exceeds the virtual charge power in the target time zone.

Here, each time zone is a unit time in which the virtual discharge or the virtual charge is performed. Each time zone may be 10 minutes, 30 minutes, or 1 hour. As described above, the power usage may include at least one of the past record and the future prospect. Therefore, all of the time zones t1 to t8 may be past time zones, all of the time zones t1 to t8 may be future time zones, and the time zones t1 to t8 may include both the past time zones and future time zones.

The controller 230 may determine a first allocation ratio as an allocation ratio for the first facility in which the power usage is a first record, and may determine as the allocation ratio a second allocation ratio greater than the first allocation ratio for a second facility in which the power usage is a second record smaller than the first record. With such a configuration, since the second facility having small power usage has priority over the first facility having large power usage, the absolute value of the power usage is leveled, so that it is possible to reduce a feeling of unfairness between the plurality of facilities 300.

For example, the controller 230 may determine the allocated amount of power according to the following formula.

$$P(x) = R(t8) \times \frac{F(x)}{\sum_N F(N)} \times \frac{\sum_N RV(N)}{RV(x)} \times \frac{1}{\sum_N \left(\frac{R(t8)}{RV(N)}\right)}$$ [Formula 1]

The above-mentioned formula exemplifies a case where the number of facilities is N. $P(x)$ is the allocated amount of power in the time zone t9 for a facility x. $R(t8)$ is the actual remaining power storage amount at a time when the time zone t8 expires. $F(x)$ is the requested amount of power of the facility x for the time zone t9. $F(N)$ is a total of the requested amount of power of the facilities for the time zone t9. $RV(x)$ is a total of the virtual remaining power storage amount of the facility x from the time zone t1 to the time zone t8. $RV(N)$ is a total of the virtual remaining power storage amount of the facilities from the time zone t1 to the time zone t8.

Here, in the above-mentioned formula, the allocated amount of power and the requested amount of power may be the amount of power related to the virtual discharge or the amount of power related to the virtual charge. That is, the above-mentioned formula can be used for the virtual discharge and the virtual charge.

For example, in an example illustrated in FIG. 3, the power usage of a facility A is 11 units, the power usage of a facility B is 13 units, and the power usage of a facility C is 15 units. Therefore, in the time zone t9, the allocation ratio of the facility A is higher than that of the facility B, and the allocation ratio of the facility B is higher than that of the facility C.

The controller 230 may determine a third allocation ratio as the allocation ratio for a third facility in which the requested amount of power is a first amount of power, and may determine a fourth allocation ratio greater than the third allocation ratio as the allocation ratio for a fourth facility in which the requested amount of power is a second amount of power smaller than the first amount of power. The allocation ratio is a ratio of the allocated amount of power to the requested amount of power. With such a configuration, since the fourth facility requesting a small requested amount of power has priority over the third facility requesting a large requested amount of power, the absolute value of the allocated amount of power is leveled, so that it is possible to reduce the feeling of unfairness between the plurality of facilities 300.

Here, the power usage illustrated in FIG. 3 may be the power usage related to the virtual discharge or may be the power usage related to the virtual charge. The power usage related to the virtual discharge and the power usage related to the virtual charge may be managed separately.

(Power Management Method)

Hereinafter, the power management method according to the embodiment will be described.

As illustrated in FIG. 4, in Step S10, the power management server 200 receives the status from the storage battery apparatus 400. The status includes an information element indicating at least one of the actual remaining power storage amount of the storage battery apparatus 400 and the actual charge reserve capacity.

In Step S11, the power management server 200 transmits usage information of the facility 300 to each of the facilities 300. The usage information includes an information element indicating at least one of the virtual remaining power storage amount and the virtual charge reserve capacity. The usage information may include an information element indicating at least one of the actual remaining power storage amount and the actual charge reserve capacity of the storage battery apparatus 400.

In Step S12, each facility 300 transmits to the power management server 200 the request including the information element indicating the requested amount of power including at least one of the virtual discharge amount and the virtual charge amount of the storage battery apparatus 400. Here, the facility 300 may transmit the request based on the usage information. For example, the facility 300 may transmit the virtual discharge request within the range that does not exceed the virtual remaining power storage amount. The facility 300 may transmit the virtual charge request within the range that does not exceed the virtual charge reserve capacity.

In Step S13, the power management server 200 determines the allocated amount of power for the requested amount of power. A method for determining the allocated amount of power is as described above.

In Step S14, the power management server 200 transmits the request response to the facilities 300. The request response includes the information element indicating the allocated amount of power determined in Step S13.

In Step S15, the power management server 200 transmits the control message to the storage battery apparatus 400. The control message is a message instructing discharging or charging of power corresponding to the allocated amount of power.

In an example illustrated in FIG. 4, a case where the request is received from the facilities 300 is illustrated. However, the embodiment is not limited to this. As described above, the request may be received from the terminal belonging to the user of the facility 300. That is, a source from which the power management server 200 obtains the request is not particularly limited. Similarly, a case where the request response is transmitted from the facility 300 is illustrated. However, the embodiment is not limited to this. As described above, the request response may be transmitted from the terminal belonging to the user of the facility 300. That is, a target to which the power management server 200 transmits the request response is not particularly limited.

(Operation and Effect)

In the embodiment, the power management server 200 determines the allocated amount of power based on the power usage. Therefore, when the requests are received in a short period of time, it is possible to appropriately allocate the charge power amount or the discharge power amount to the plurality of facilities 300 while reducing the feeling of unfairness between the facilities 300.

[Modification 1]

Hereinafter, Modification 1 of the embodiment will be described. In the following, differences from the embodiment will be mainly described.

Specifically, in Modification 1, the power management server 200 determines a price of the virtual charge for the virtual discharge. Specifically, the power management server 200 may determine the price based on supply and demand balance of the power grid 110. That is, the power management server 200 may set a power sale price for the virtual discharge to be high and a power purchase price for the virtual charge to be low when the power is insufficient in the power grid 110. The power management server 200 may set the power sale price for the virtual discharge to be low and the power purchase price for the virtual charge to be high when the power is excessive in the power grid 110.

(Power Management Method)

Hereinafter, the power management method according to Modification 1 will be described. In the following, differences from FIG. 4 will be mainly described.

As illustrated in FIG. 5, in Step S20, the power management server 200 determines the price of the virtual charge for the virtual discharge. As described above, the power management server 200 may determine the price based on the supply and demand balance of the power grid 110.

In such a case, in Step S11, the power management server 200 may transmit the usage information including the information element indicating the price determined in Step S20 to the facilities 300. In Step S12, the facility 300 may transmit the request based on the price. For example, the facility 300 may positively transmit a request for discharge when the power sale price of the virtual discharge is low. Similarly, the facility 300 may positively transmit the request for discharge when the power purchase price for the virtual charge is low.

OTHER EMBODIMENTS

Although the present invention has been described by the above-described embodiments, it should not be understood that the description and drawings forming a part of this disclosure limit the present invention. From this disclosure, various alternative embodiments, examples, and operation techniques will be apparent to those skilled in the art.

In the embodiment, the facility 300 is exemplified as an entity that shares the storage battery apparatus 400. However, the embodiment is not limited to this. The entity may be any entity that shares the storage battery apparatus. For example, the entity may be the user. In such a case, the storage battery apparatus 400 may be provided in an electric vehicle shared by two or more users (car shelling).

Although not particularly mentioned in the embodiments, the facility 300 may have an individual storage battery apparatus different from the storage battery apparatus 400.

Although not particularly mentioned in the embodiments, the storage battery apparatus 400 may be charged by the power (power of the reverse power flow) output from the distributed power supply 310 to the power grid 110. That is, the power corresponding to the virtual charge amount may be output from the distributed power supply 310 to the power grid 110 in conjunction with the virtual charge.

In the embodiments, the facility 300 has the distributed power supply 310. However, the embodiment is not limited to this. The facility 300 may not have the distributed power supply 310.

In the embodiments, the power management server 200 has the database 210. However, the embodiment is not limited to this. The database 210 may be a cloud server provided on the Internet.

Although not specifically mentioned in the embodiments, the EMS 320 provided in the facility 300 does not necessarily have to be provided in the facility 300. For example, some of the functions of the EMS 320 may be provided by the cloud server provided on the Internet. That is, it may be considered that the EMS 320 includes the cloud server.

In the embodiments, a case where the first protocol is a protocol conforming to Open ADR2.0 and the second protocol is a protocol conforming to ECHONET Lite has been exemplified. However, the embodiment is not limited to this. The first protocol may be any protocol standardized as a protocol used for communication between the power management server 200 and the EMS 320. The second protocol may be any protocol standardized as a protocol used in the facility 300.

The entire contents of Japanese Patent Application No. 2018-013525 (filed on Jan. 30, 2018) are incorporated in the present application by reference.

The invention claimed is:

1. A power management server, comprising:
   a processor and a memory coupled to the processor, the processor configured to execute:
      receiving requests from a plurality of entities, each of the requests including information indicating a requested amount of power including at least one of a virtual discharge amount and a virtual charge amount of a storage battery apparatus shared by the plurality of entities,
      monitoring power usage of the storage battery apparatus for each of the plurality of entities,
      estimating a future remaining power storage amount of the storage battery apparatus for each of the plurality of entities,
      determining an allocated amount of power for the requested amount of power based on the power usage upon satisfaction of a constraint condition as a result of the requests received in a period of time, and
      transmitting, to the storage battery apparatus shared by the plurality of entities, a control message to control the storage battery apparatus to discharge or charge of power corresponding to the determined allocated amount of power, wherein
   the processor is further configured to execute:
      determining a first allocation ratio as an allocation ratio of the allocated amount of power to the requested amount of power, for a first entity in which the requested amount of power is a first amount of power, and
      determining a second allocation ratio greater than the first allocation ratio as the allocation ratio, for a second entity in which the requested amount of power is a second amount of power smaller than the first amount of power, and wherein an operation of the storage battery apparatus is controlled based on the first and the second allocation ratios.

2. The power management server according to claim 1, wherein the processor is configured to manage a future remaining power storage amount of the storage battery apparatus independently of an actual remaining power storage amount of the storage battery apparatus.

3. The power management server according to claim 1, wherein the power usage includes a past record actually performed in the past.

4. The power management server according to claim 1, wherein the power usage includes a future prospect planned for the future.

5. The power management server according to claim 1, further comprising a transmitter configured to transmit a request response including an information element indicating the allocated amount of power.

6. The power management server according to claim 1, wherein the constraint condition is determined based on at least one of an actual remaining power storage amount of the storage battery apparatus, an actual power storage reserve capacity of the storage battery apparatus, dischargeable power of the storage battery apparatus in unit time, or chargeable power of the storage battery apparatus in unit time.

7. The power management server according to claim 1, wherein the processor is configured to determine prices for the virtual discharge amount and the virtual charge amount of the storage battery apparatus.

* * * * *